Aug. 20, 1929.  R. S. SANFORD  1,725,020
BRAKE OPERATING SHAFT AND ITS CONNECTION AND MOUNTING
Filed Oct. 21, 1926
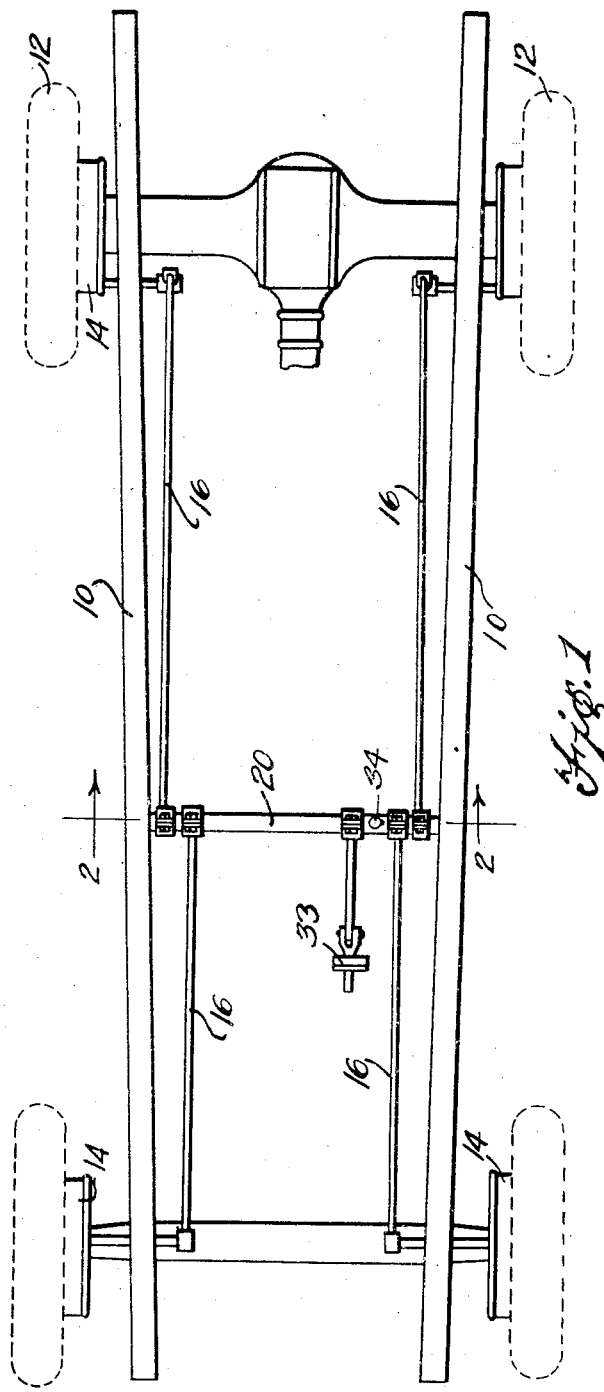
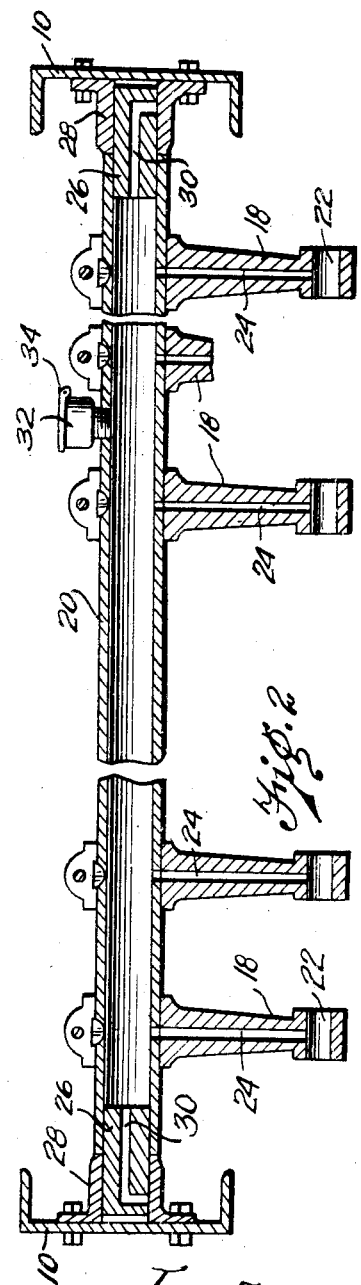
Inventor:
Roy S. Sanford
Burton & McConkey
Attorneys.

Patented Aug. 20, 1929.

1,725,020

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING SHAFT AND ITS CONNECTION AND MOUNTING.

Application filed October 21, 1926. Serial No. 143,099.

My invention relates to improvements in brake operating shafts and their connections and to improvements in the mounting and the lubrication thereof.

The object is to provide an improved brake operating shaft provided with a mounting of an improved design and with suitable connections, all of simple, efficient construction, so arranged as to provide a receptacle for lubricant having communicating outlets leading to the connections on the shaft and to the shaft mounting to lubricate the same during the operation of the shaft and its connections.

I have shown my invention as embodied in a brake operating shaft on a motor vehicle chassis of the usual type and provided with connections leading to brake structures associated with each of the traction wheels of the vehicle.

Other advantageous objects and meritorious features of my improvement will more fully appear from the following description of the invention shown in the accompanying drawings and from the claims.

In the drawings:

Fig. 1 is a plan of a vehicle chassis provided with my invention.

Fig. 2 is a vertical sectional view through the operating shaft taken on the line 2—2 of Fig. 1.

I have shown in the drawing the chassis of a common type of four-wheel road vehicle in which the side frame members 10 are of channel construction as shown in Fig. 2 and the vehicle is supported at each end by a pair of road wheels 12, each of which wheels may be provided with a brake 14 having a connection 16 which leads to an arm 18 mounted upon a brake operating shaft 20.

The brake operating shaft 20 is hollow as shown in Fig. 2. A plurality of arms 18 are fixed thereon, as illustrated. These arms have bearings 22 within which a part of an operating connection is mounted. Each arm is provided with a lubricant passageway 24 leading from the bearing 22 to the interior of the shaft 20 so that lubricant may pass from the interior of the shaft to the bearing.

A plug 26 is fixed in each end of the shaft. This plug extends beyond the end of the shaft as shown in Fig. 2. A bearing socket 28 is mounted upon each side frame member 10 within the channel thereof and the hollow shaft 20 is positioned between these bearing sockets and the projecting ends of plugs 26 are mounted within the sockets 28 so that the shaft is supported thereby for rotatable oscillation. Each plug 26 is provided with an angularly extending passageway 30 which leads from the interior of the shaft to the side wall of the bearing socket to distribute lubricant thereover. The shaft is provided with an inlet 32 having a suitable closure 34 through which the shaft may be filled with lubricant.

The hollow shaft serves as a lubricant reservoir. The arms carried by the shaft are arranged relatively angularly thereabout. Each arm has a bearing remote from the shaft and a lubricant passageway extending from said bearing to the interior of the shaft so that lubricant passes from the interior of the shaft to the wall of the bearing. As the shaft is rotated upon actuation of the pedal 33 and its operating connections are moved, lubricant passes from its interior to the bearings to lubricate them.

The plug closures at each end of the shaft also serve as bearings within the socket connections which support the shaft and form convenient and suitable mountings for a shaft lubricated in this particular fashion.

What I claim is:

1. A vehicle chassis provided with opposed channeled side frame members, a pair of oppositely disposed bearing sockets carried thereby one mounted within the channel of one side frame member and the other mounted within the channel of the other side frame member, a hollow tubular shaft positioned between said sockets with its ends arranged opposite the ends of the sockets, a closure plug secured within each end of the shaft and extending therebeyond and received within the adjacent socket forming a supporting bearing within the socket for the shaft; each plug provided with a lubricant passageway extending from the interior of the shaft through the plug to the side wall of the socket.

2. A vehicle chassis provided with opposed channeled side frame members, a pair of oppositely disposed bearing sockets carried thereby one mounted within the channel of one side frame member and the other mounted within the channel of the other side frame member, a hollow tubular shaft positioned between said sockets with its ends arranged opposite the ends of the sockets, a closure plug secured within each end of the shaft and extending therebeyond and received within the adjacent socket forming a supporting bearing within the socket for the shaft; each plug provided with a lubricant passageway extending from the interior of the shaft through the plug to the side wall of the socket; an arm mounted on the shaft having a bearing at its outer end and provided with a lubricant passageway extending lengthwise therethrough, said shaft provided with a lubricant passageway registering with the passageway through the arm and leading into the interior of the shaft.

In testimony whereof, I, Roy S. Sandford, sign this specification.

ROY S. SANFORD.